US008024881B2

(12) United States Patent
Redmon

(10) Patent No.: US 8,024,881 B2
(45) Date of Patent: Sep. 27, 2011

(54) LOCK FOR FRAME

(75) Inventor: Shanon O Redmon, Greenfield, IN (US)

(73) Assignee: Draper, Inc., Spiceland, IN (US)

( * ) Notice: Subject to any disclaimer, the term of this patent is extended or adjusted under 35 U.S.C. 154(b) by 1485 days.

(21) Appl. No.: 11/070,071

(22) Filed: Mar. 2, 2005

(65) Prior Publication Data
US 2005/0200951 A1 Sep. 15, 2005

Related U.S. Application Data

(60) Provisional application No. 60/551,812, filed on Mar. 10, 2004.

(51) Int. Cl.
*E01F 9/00* (2006.01)
(52) U.S. Cl. ......... 40/610; 40/607.04; 40/612; 248/166; 248/440.1
(58) Field of Classification Search ............... 16/84, 326, 16/327; 40/610, 607.04, 612; 240/170; 248/166, 248/165, 155.5, 440.1; 292/219, 220, 228, 292/DIG. 63, 121, 122, 128
See application file for complete search history.

(56) References Cited

U.S. PATENT DOCUMENTS

| 1,336,638 | A | * | 4/1920 | Kutwicz | 135/74 |
|---|---|---|---|---|---|
| 1,662,586 | A | | 3/1928 | Newman | |
| 2,827,955 | A | | 3/1958 | Hurley | |
| 3,041,032 | A | * | 6/1962 | Wilcox | 248/170 |
| 4,040,181 | A | | 8/1977 | Johnson | |
| 4,161,818 | A | | 7/1979 | Phelps | |
| 4,218,819 | A | | 8/1980 | Phelps | |
| 4,233,737 | A | | 11/1980 | Poehlmann | |
| 4,444,240 | A | | 4/1984 | Bannister | |
| 4,479,340 | A | | 10/1984 | Alphonse et al. | |
| 4,942,686 | A | | 7/1990 | Kemeny | |
| 4,999,938 | A | * | 3/1991 | Behling | 40/610 |
| 5,501,051 | A | | 3/1996 | Harlan | |
| 6,334,687 | B1 | | 1/2002 | Chino et al. | |
| 6,393,748 | B1 | * | 5/2002 | Cooper | 40/610 |
| 6,466,369 | B1 | | 10/2002 | Maddock | |
| 6,606,809 | B2 | * | 8/2003 | Hillstrom et al. | 40/610 |
| 6,870,672 | B2 | | 3/2005 | Stumpfl | |
| 7,062,872 | B2 | * | 6/2006 | Williams et al. | 40/586 |
| 7,254,869 | B2 | * | 8/2007 | You | 16/326 |
| 7,314,199 | B1 | * | 1/2008 | Ward | 248/166 |

FOREIGN PATENT DOCUMENTS

| EP | 03 741 925.6 | 6/2003 |
|---|---|---|
| JP | 45-068625 | 3/1973 |
| JP | 48-018211 A | 3/1973 |
| JP | 3001574 U | 1/1991 |
| JP | 3086722 U | 9/1991 |
| JP | 06-018988 A | 1/1994 |
| JP | 06-235974 A | 8/1994 |

(Continued)

OTHER PUBLICATIONS

AV-STUMPFL, News 2001#01 (dated Feb. 8, 2001).

(Continued)

*Primary Examiner* — Joanne Silbermann
*Assistant Examiner* — Shin Kim
(74) *Attorney, Agent, or Firm* — Baker & Daniels LLP

(57) ABSTRACT

A display apparatus is disclosed that includes a screen and a frame system positioned to support the screen. The frame system includes a plurality of frame members, a hinge that couples the frame members together, and a lock that blocks relative movement of the frame members.

42 Claims, 8 Drawing Sheets

FOREIGN PATENT DOCUMENTS

| | | |
|---|---|---|
| JP | 08-292497 A | 11/1996 |
| JP | 2000131766 A | 5/2000 |
| JP | 2002507098 A | 3/2002 |
| JP | 2002209639 A | 7/2002 |
| WO | WO 03/104088 | 6/2003 |

OTHER PUBLICATIONS

AV-STUMPFL, "Presentation Technology Changes. Soon," 1999 English edition.
AV-STUMPFL, "Presentation Technology is Changing," Edition Photokina 2000.
AV STUMPFL, "Projection Screens—Mobile and Permanent," Edition Photokina 2002.
Da-Lite Screen Company, Inc., "The Power in Presentation Products," 2001, USA.
Draper, Inc., "Products for Visual Communication," 2002, USA.
Draper, Inc., "Tripod and Portable Screens" brochure, 2003, U.S.A.
The Screen Works, "E-Z Fold & E_Z Fold III," date Unknown.
Description of AV Stumpfl snap joint (includes 8 photos); date unknown.
The Hague; Supplementary European Search Report; Jan. 29, 2009; 2 pages; European Patent Office; The Netherlands.
Office Action dated Apr. 27, 2010 for Japanese Patent Application No. 2007-502852 filed Sep. 8, 2006; First Named Inventor, Shanon O. Redmon.

* cited by examiner

LOCK FOR FRAME

This application claims the benefit of U.S. Provisional Patent Application Ser. No. 60/551,812, filed Mar. 10, 2004 the disclosure of which is expressly incorporated by reference herein.

BACKGROUND AND SUMMARY OF THE INVENTION

The present invention relates to projection screens. More particularly, the present invention relates to tensioned projection screens.

According to one aspect of the present invention, a display apparatus is provided including a screen and a frame system supporting the screen. The frame system has a plurality of frame members, a hinge coupling two of the frame members together, and a lock positioned to block movement of the frame members coupled together by the hinge. The frame members are coupled together by the hinge cooperating to define a longitudinal axis and a transverse profile. At least a portion of the lock is positioned within the transverse profile.

According to another aspect of the present invention, a display apparatus is provided including a screen and a frame system supporting the screen. The frame system has a plurality of frame members, a hinge coupling two of the frame members together, and a lock positioned to block relative movement of the frame members. The lock includes first and second interactive members. The first interactive member has a key. The second interactive member has a key-receiving portion that receives the key of the first interactive member to block relative movement of the frame members when the key is positioned in the key-receiving portion and to permit relative movement of the frame members when the key is spaced apart from the key-receiving portion.

According to another aspect of the present invention, a display apparatus is provided including a screen and a frame system supporting the screen. The frame system has at least first and second frame members, a hinge coupling the first and second frame members together, and a lock positioned to block relative movement of the first and second frame members. The hinge includes a first hinge member, a second hinge member pivotally coupled to the first hinge member, third hinge member, and a fourth hinge member pivotally coupled to the third hinge member. The first and third hinge members are rigidly coupled to the first frame member. The second and fourth hinge members are rigidly coupled to the second frame member. The second hinge member is positioned between the first hinge member and the second frame member. The third hinge member is positioned between the fourth hinge member and the second frame member.

Additional features of the present invention will become apparent to those skilled in the art upon consideration of the following detailed description of the preferred embodiment exemplifying the best mode of carrying out the invention as presently perceived.

BRIEF DESCRIPTION OF THE DRAWINGS

A detailed description particularly refers to the accompanying figures in which.

DETAILED DESCRIPTION OF THE DRAWINGS

According to the present disclosure, a display or projection screen apparatus system 10 is provided to display images projected by a projector (not shown). Typically, projection screen apparatus 10 is supported on the floor of a building or other structure. Projection screen apparatus 10 may be used in either front or rear projection applications. In some applications, speakers (not shown) are positioned behind the projection screen apparatus 10 so that the sound is transmitted through projection screen apparatus 10.

Figure 1:
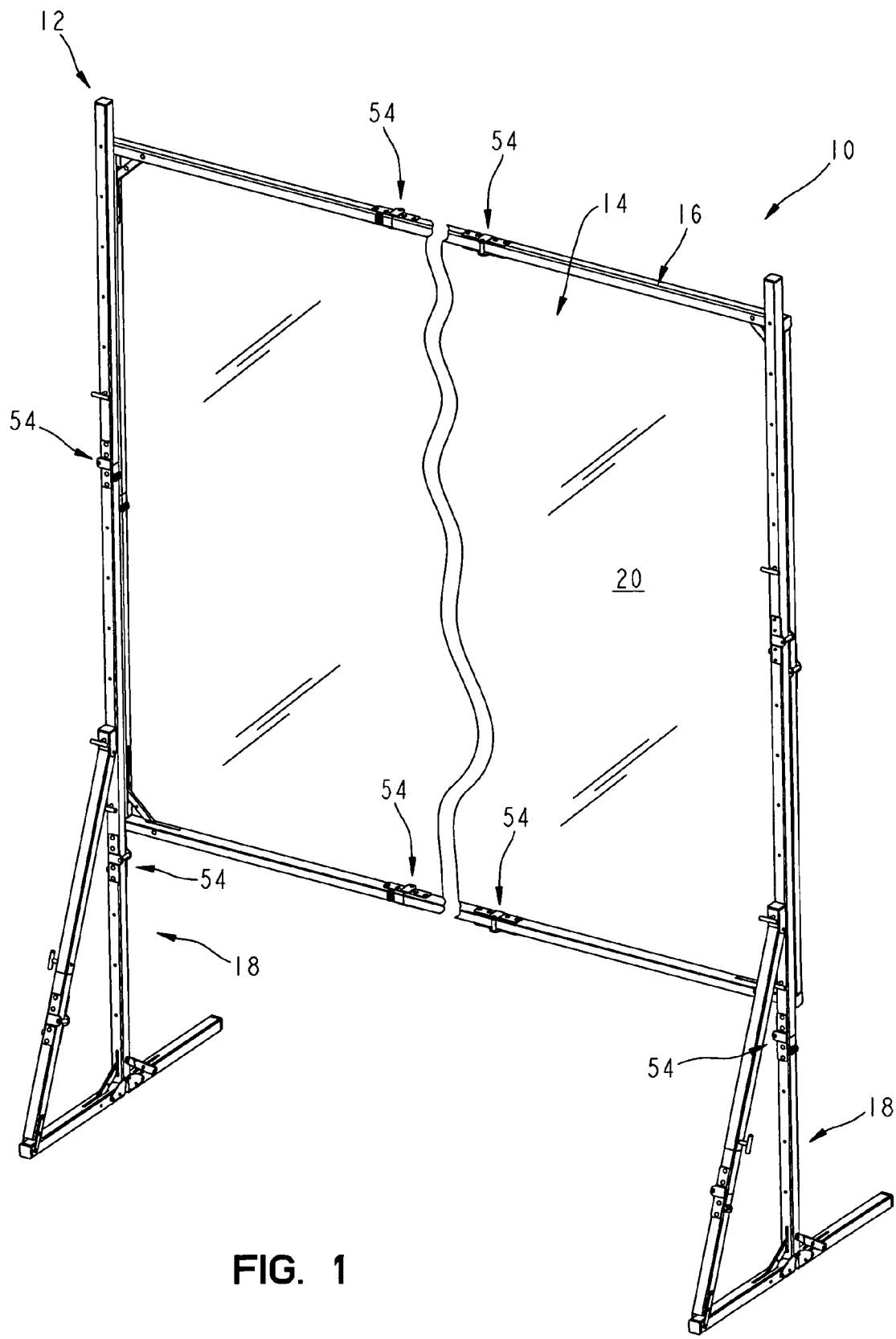
FIG. 1 is a rear perspective view of a projection screen apparatus showing the projection screen apparatus including a frame system having a pair of support legs and a rectangular screen frame supported by the legs and a projection screen coupled to the screen frame.
Figure 2:
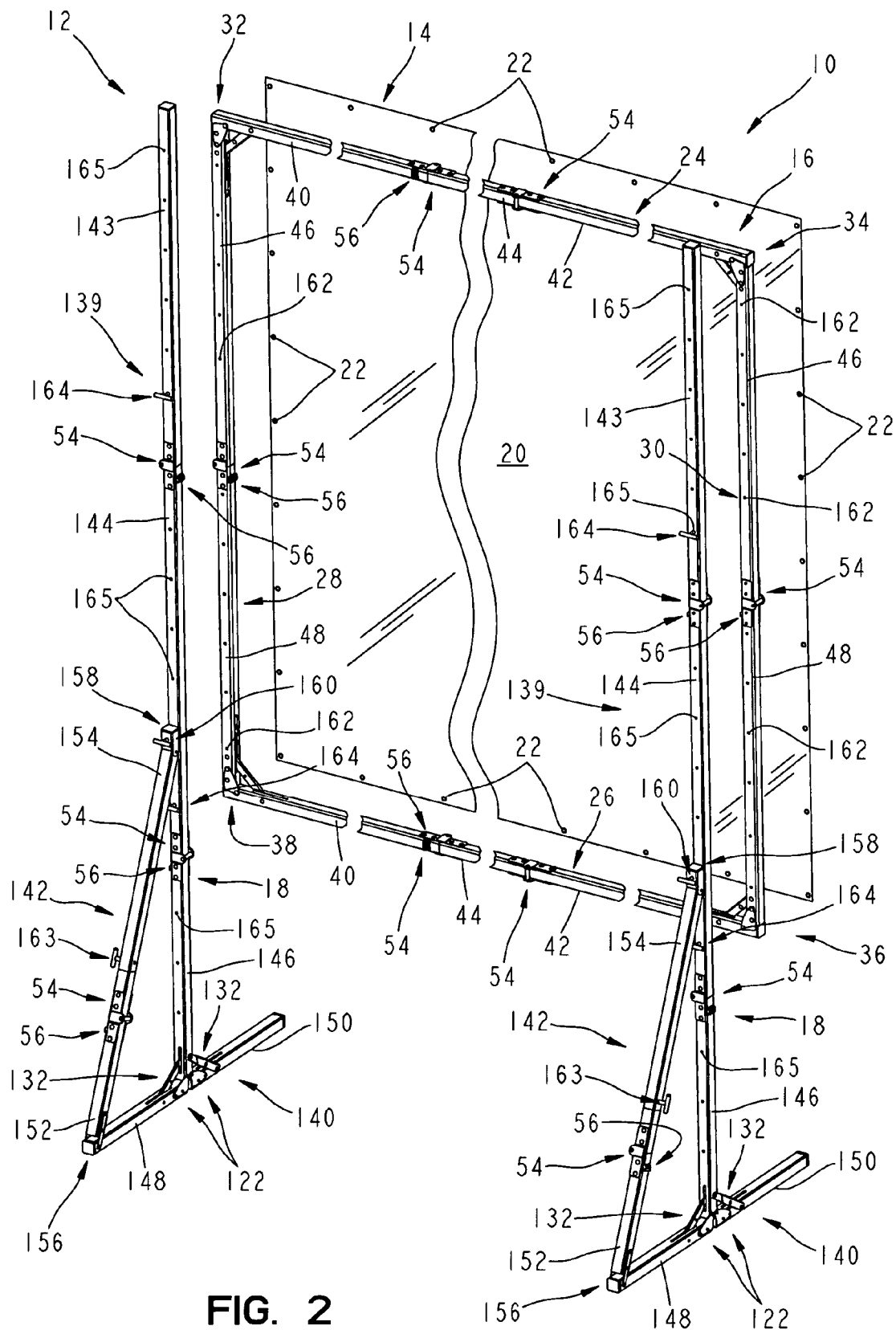
FIG. 2 is an rear exploded perspective view of the projection screen apparatus showing the frame system and the projection screen including a screen fabric and a plurality of snaps configured to couple the screen fabric to the screen frame.

As shown in FIG. 2, projection screen apparatus 10 includes a frame system 12 and a projection screen 14. Frame system 12 includes a rectangular screen frame 16 and a pair of support legs 18 that support frame 16 at an elevated position. Projection screen 14 include screen fabric 20 and a plurality of couplers or snaps 22 that couple screen fabric 20 on frame 16. When coupled to frame 16, projection screen 14 is tensioned on frame 16 to provide a substantially flat viewing surface (not shown).

Typically, screen fabric 20 is blank to reflect or otherwise show an image provided by a projector. According to one embodiment, screen fabric 20 of display system 10 is provided with printed or other types of graphics used for advertisements or other information or aesthetic purposes. Screen fabric 20 is preferably made of vinyl. According to other embodiments, other fabrics are provided such as those disclosed in U.S. Provisional Patent Application Ser. No. 60/546,410, titled Reinforced Projection Screen Fabric, to Jerry L. McPherson, Jr., filed Feb. 20, 2004, the disclosure of which is expressly incorporated herein by reference, or U.S. patent application Ser. No. 10/327,421, titled Tensioned Projection Screen, to Kenneth M. Risher, filed Dec. 12, 2002, the disclosure of which is expressly incorporated herein by reference, and other fabrics known to those of ordinary skill in the art. According to other embodiments, other coupling devices are provided for coupling the screen fabric to the screen frame. For example, according to other embodiments, the coupling system disclosed in U.S. patent application Ser. No. 10/327,421, titled Tensioned Projection Screen, to Kenneth M. Risher, filed Dec. 20, 2002, the disclosure of which is expressly incorporated herein by reference, hook-and-loop fastener strips, adhesive, stay-puts, and other known coupling devices or methods are provided.

Figure 10:
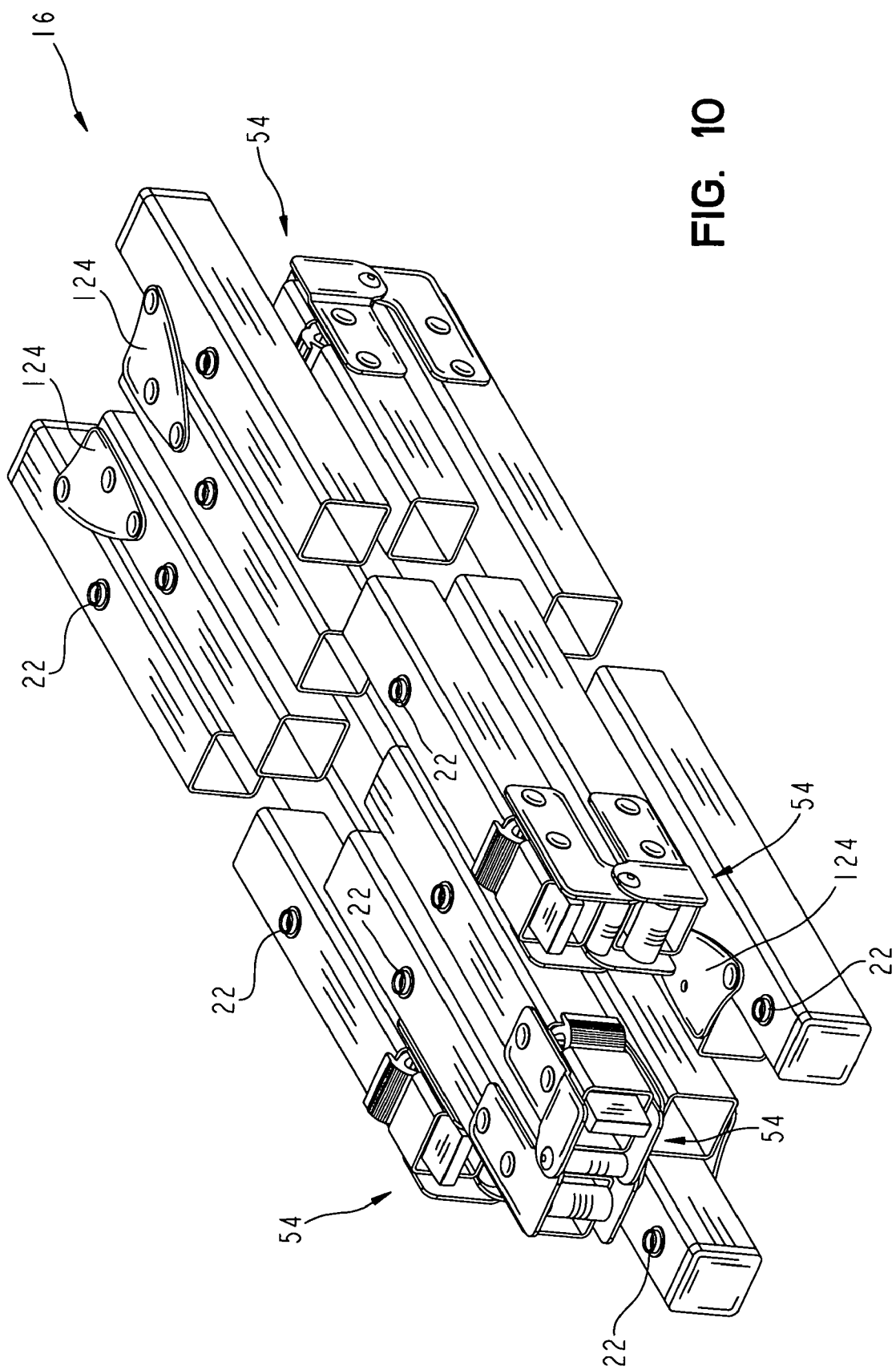
FIG. 10 is a perspective view of the rectangular screen frame of FIG. 1 showing the frame, with portions broken away, in a collapsed or folded position for storage or transportation.

Frame 16 includes top, bottom, left, and right assemblies 24, 26, 28, 30 that meet to define first, second, third, and fourth corners 32, 34, 36, 38 as shown in FIG. 2. To facilitate storage and/or transportation, assemblies 24, 26, 28, 30 each fold or "break down" so that frame 16 is a more compact unit as shown in FIG. 10.

Figure 4:
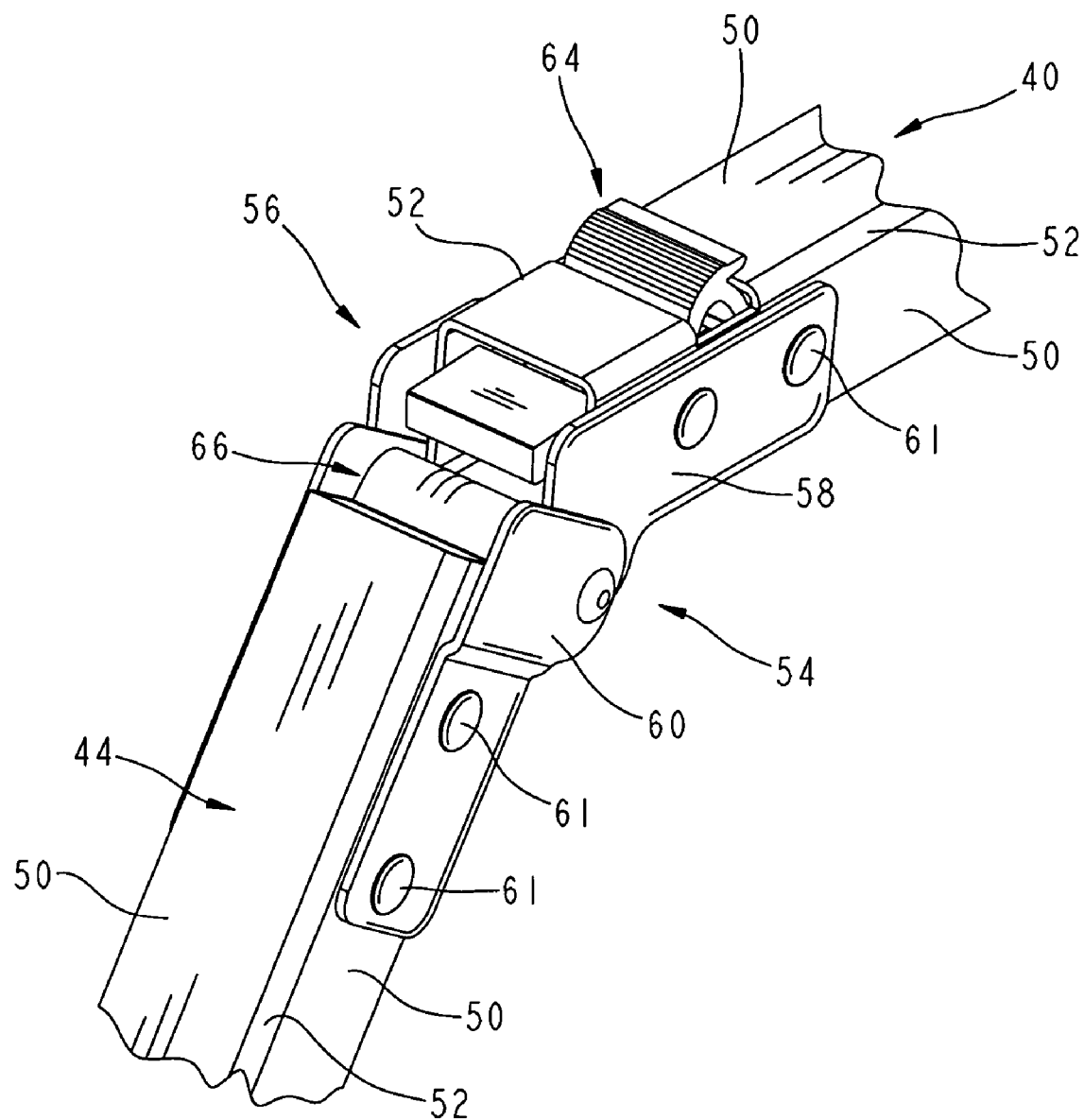
FIG. 4 is a similar to FIG. 3 showing the lock in an unlocked position permitting the frame members to pivot on the hinge.

Top and bottom assemblies 24, 26 each include right, left, and middle tubular frame members 40, 42, 44. Left and right assemblies 28, 30 each include top and bottom tubular frame members 46, 48. Each frame member 40, 42, 44, 46, 48 is made of extruded aluminum having four substantially flat sidewalls 50 and four rounded corners 52 as shown in FIG. 4 that cooperate to define an outer wall and two ends of each frame member 40, 41, 44, 46, 48.

Top, bottom, left, and right assemblies 24, 26, 28, 30 also include hinges 54 between right and left frame members 40, 42 and middle frame members 44 and between top and bottom frame members 46, 48. Hinges 54 provide for pivoting between the respective frame members 40, 42, 44, 46, 48.

Figure 3:
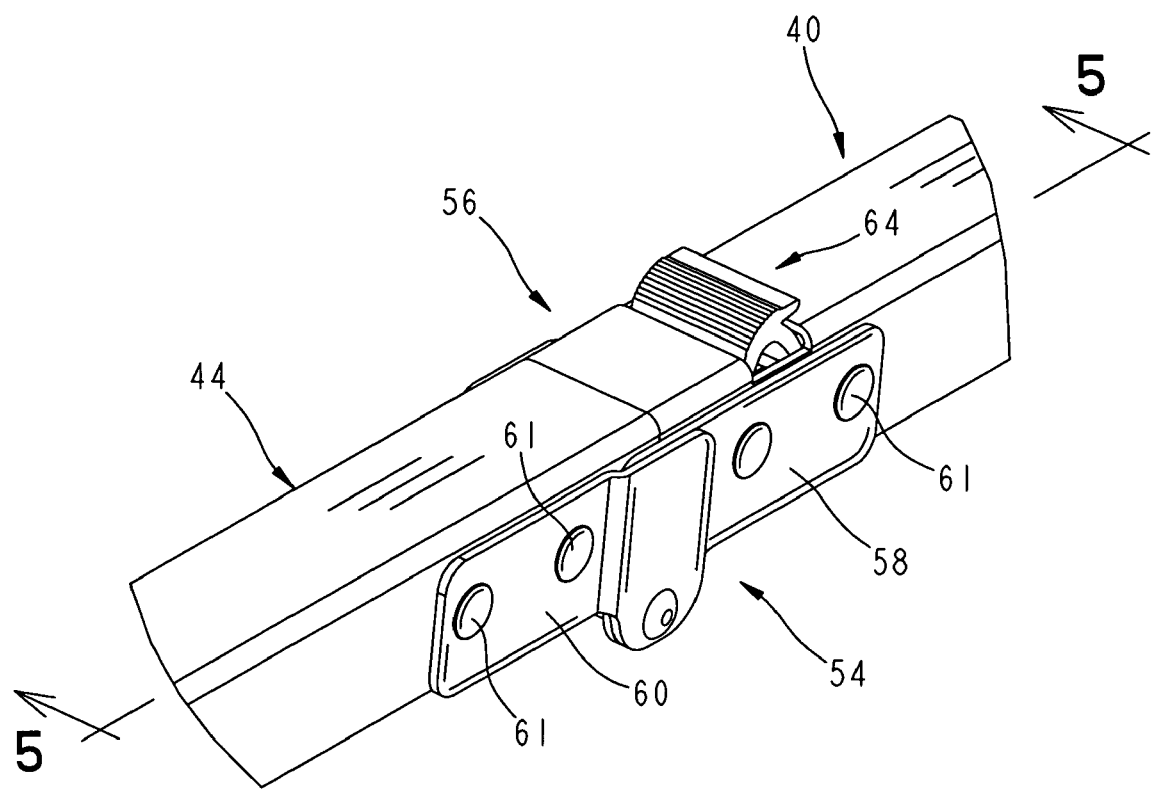
FIG. 3 is a perspective view of a portion of the screen frame showing the screen frame including a pair of frame members, with portions broken away, a hinge pivotally coupling the frame members together, and a lock in a locked position blocking pivoting of the frame members.

Top, bottom, left, and right assemblies 24, 26, 28, 30 also include locks 56 between right and left frame members 40, 42 and middle frame members 44 and between top and bottom frame members 46, 48. Locks 56 are positioned in a passage defined by respective frame members 40, 42, 44, 46, 48 and block pivoting movement of these respective frame members 40, 42, 44, 46, 48 during setup and use of projection screen apparatus 10 as shown in FIG. 3 for exemplary frame members 40, 44. When it is time to store or transport screen apparatus 10, lock 56 is moved to an unlocked position so that frame members 40, 44 can pivot about hinge 54 as shown in FIG. 4.

Figure 9:
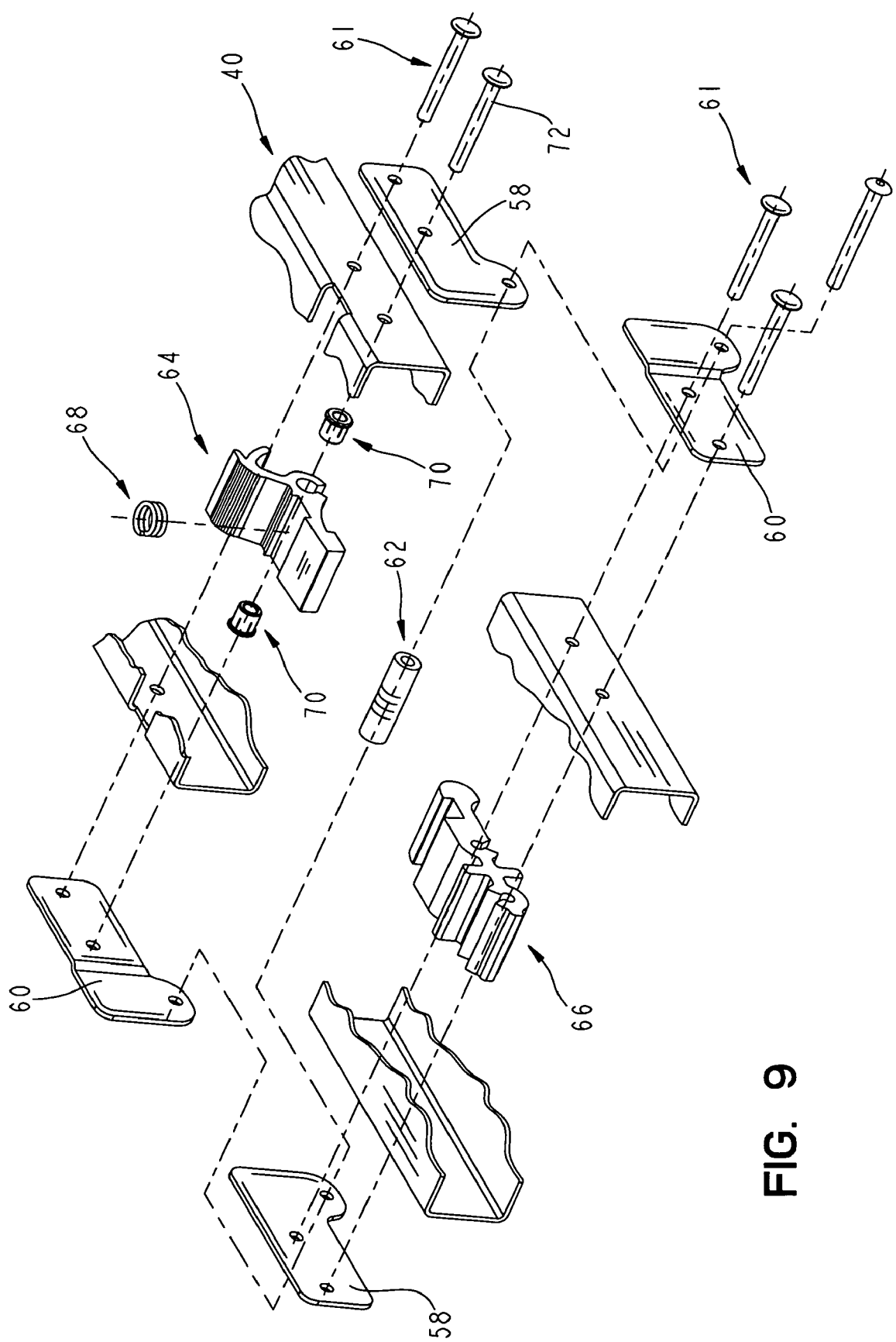
FIG. 9 is an exploded perspective view of the frame members and lock of FIG. 3.

As shown in FIG. 9, hinge 54 includes two inner hinge plates or members 58 rigidly coupled to respective frame members 40, 42, 44, 46, 48, two outer hinge plates or members 60 rigidly coupled to respective frame members 40, 42, 44, 46, 48, a plurality of rivets 61, and a spacer or bushing 62. Inner and outer hinge plates 58, 60 are coupled to frame members 40, 44 by rivets 61. When assembled, outer hinge plates 60 are positioned outside of inner hinge plates 58 and coupled together by rivet 61 with bushing 62 positioned over one of rivets 61 between inner hinge plates 58. The outer diameter or width of bushing 62 is greater than a distance between the ends of respective frame members 40, 42, 44, 46, 48 when aligned as shown in FIG. 3. When respective frame members 40, 42, 44, 46, 48 are aligned, each hinge plate 58, 60 overlaps two of the respective frame members 40, 42, 44, 46, 48 as shown in FIG. 3 for frame members 40, 44. Furthermore, inner hinge plates 58 are sandwiched between outer hinge plates 60 and respective frame members 40, 42, 44, 46, 48 as shown in FIG. 3 for frame members 40, 44.

Lock 56 includes first and second lock members or interactive members 64, 66, a biaser or spring 68, a pair of sintered bronze bushings 70, and a rivet or pivot member 72. First interactive member 64 is positioned inside of frame member 40 and pivots about a pivot axis defined by rivet 72 on bushings 70. Second interactive member 66 is positioned inside frame member 44 and held against rotation by rivets 61 that couple inner and outer plates 58, 60 to frame member 44. First and second interactive members 64, 66 are preferably made of extruded aluminum. According to alternative embodiments of the present disclosure, other materials are used such as plastic materials, other metals, and other materials known to those of ordinary skill in the art.

Figure 5:
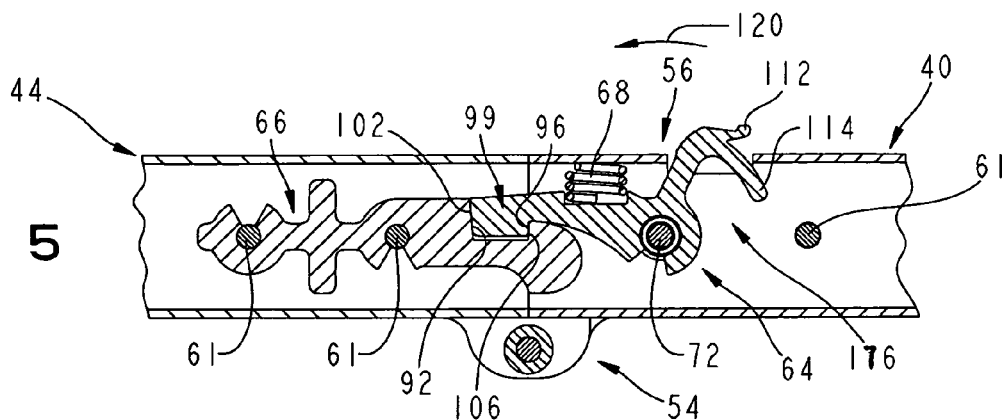
FIG. 5 is a cross-sectional view taken along line 5-5 of FIG. 3 showing the lock including first and second interactive members that interact to block pivoting of the frame members about the hinge.

As shown in FIG. 5, first interactive member 64 engages second interactive member 70 to block relative pivoting of frame members 40, 44. Spring 68 urges first interactive member 64 toward second interactive member 66 to maintain this engagement. When in the locked position, ends of frame members 40, 44 preferably abut so that the distance between frame members 40, 44 is minimal. However, depending upon the precision of the machining and assembly, a small gap may exist between the end of frame members 40, 44 when in the locked position. When in this position, first and second interactive members 64, 70 extend through the ends of each frame member 40, 44 so that a portion of each frame member 40, 44 is positioned within each frame member 40, 44 as shown in FIG. 5.

When locked, frame members 40, 44 cooperate to define a longitudinal axis and define a relatively square transverse profile. Preferably, the majority of lock 56 is positioned within this transverse profile to limit the exposure of lock 56 outside of frame members 40, 44 to avoid interference with screen 14.

Figure 6:
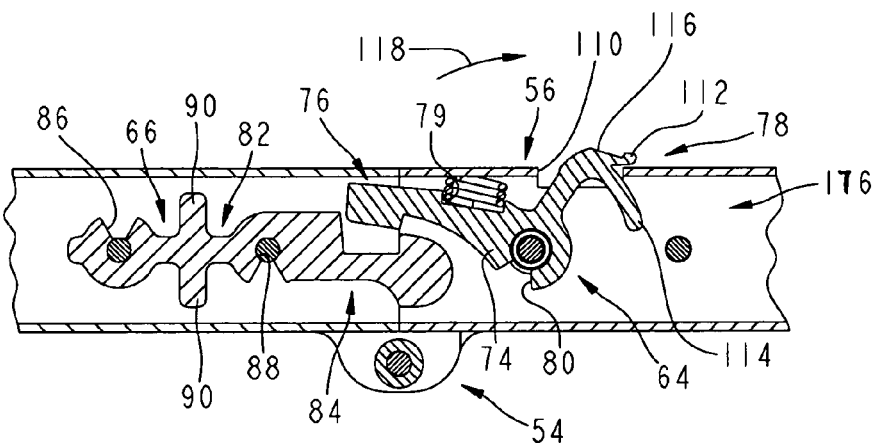
FIG. 6 is view similar to FIG. 5 showing one of the interactive members rotated by a user about a pivot pin to disengage the other interactive member and permit pivoting of the frame members relative to one another.

As shown in FIG. 6, first interactive member 64 includes a body portion 74, a locking portion 76, and a button or release portion 78. Body portion 74 includes a first groove or notch 79 to receive a portion of spring 68 and a second groove or notch 80 to receive portions of pin member 72 and bushings 70.

Second interactive member 66 includes a body portion 82 and a locking portion 84. Body portion 82 includes a pair of grooves 86, 88 to receive portions of rivets 61 and a pair of extension 90. Extensions 90 have a width that is equal to or slightly smaller than the inner width of flat side walls 50 so that extensions 90 are blocked from sliding laterally by inner portions of rounded corners 52. This assists in centering second interactive member 66 within frame member 44 during assembly.

Figure 7:
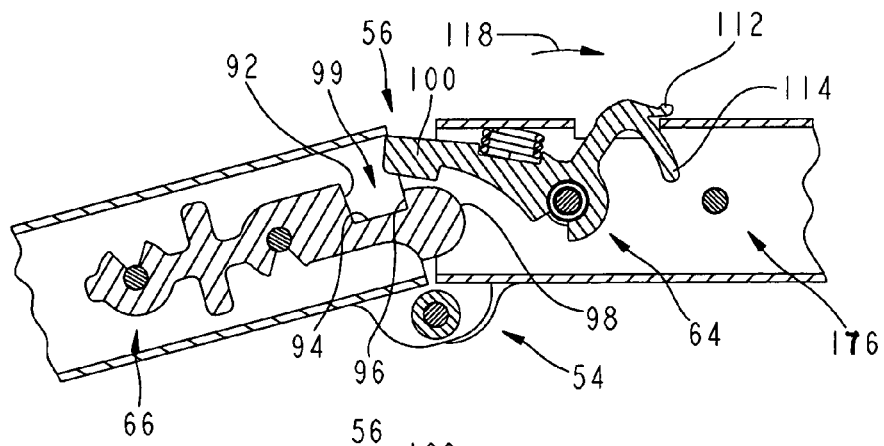
FIG. 7 is view similar to FIG. 5 showing the interactive members disengaged and the frame members rotated relative to one another.

Locking portions 76, 84 of first and second interactive members 64, 66 are shaped to facilitate locking and unlocking of lock 56. Key-receiving or locking portion 84 of second interactive member 66 includes first, second, third, and fourth surfaces 92, 94, 96, 98. As shown in FIG. 7, first, second, and third surfaces 92, 94, 96 are relatively flat and cooperate to define a groove, or notch 99 that receives a key 100 of first interactive member 64. First and second surfaces 92, 94 cooperate to define an angle of 95°. First surface 92 also cooperates with a line (not shown) extending between rivets 61 and pivot member 72 to define an angle of 95° when lock 56 is in the locked position as shown in FIG. 5. Third surface 96 is substantially tangent to the pivot axis defined by pivot member 72.

Key 100 is wedge-shaped and includes first, second, and third relatively flat surfaces 102, 104, 106 and body portion 74 of first interactive member 64 includes a curved surface 108. First and second surfaces 102, 104 cooperate to define and angle of 95°. First surface 102 also cooperates with the line (not shown) extending between rivets 61 and pivot member 72 to define an angle of 95° when lock 56 is in the locked position as shown in FIG. 5. Third surface 106 is substantially tangent to pivot axis defined by pivot member 72.

When first and second interactive members 64, 66 are in the locked position, first surface 102 of first interactive member 64 abuts first surface 92 of second interactive member 66 as shown in FIG. 5. This abutment prevents frame member 44 from pivoting any further toward frame member 40 so that frame members 40, 44 have little, if any, "play" therebetween even if a gap exists between frame members 40, 44. Similarly, third surface 106 of first interactive member 64 abuts third surface 96 of second interactive member 66 to block frame member 44 from pivoting away from frame member 40 to block pivoting between frame members 40, 44.

To unlock lock 56, a user presses down on release portion 78 of first interactive member 64 that extends through an aperture 110 formed in frame member 40. Release portion 78 includes a first extension or portion 112 that extends outside of the relatively square transverse profile and second extension 114 partially positioned within and partially outside the relatively square transverse profile. Preferably, upper surface 116 of release portion 78 and first extension 112 include a plurality of ridges, shown in FIG. 4, that provide traction for the user's thumb or finger. The force applied to first extension 112 by the users thumb or finger is transmitted through aperture 110.

First extension 112 limits the rotation of first interactive member 64 in direction 118 as shown in FIGS. 6 and 7. Similarly, second extension 114 blocks rotation of first interactive member 64 in direction 120 as shown in FIG. 5. Second extension 114 also blocks objects from entering an interior 176 of frame member 40 through aperture 110.

By having the 95° angles, key 100 of first interactive member 64 and notch 99 of second interactive member 66 are slightly wedge-shaped and key 100 is less likely to catch on second interactive member 66 than if the angles were 90°. According to other embodiments of the present disclosure, other angles are provided such as 90°, 92.5°, 97.5°, and 100°. Curved surface 108 of first interactive member 64 provides clearance for curved surface 98 of second interactive member 66.

When first interactive member 64 is moved to the position shown in FIG. 6, first and second frame members 40, 44 can be pivoted relative to one another up to 180° so that first and second frame members 40, 44 are positioned adjacent one another as shown in FIG. 10.

Figure 8:
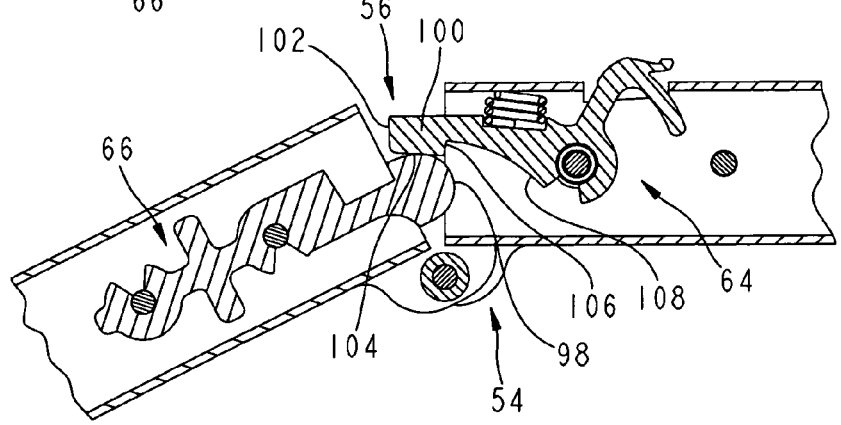
FIG. 8 is a view similar to FIG. 5 showing one of the interactive members sliding over the other interactive member during pivoting of the frame members toward the position show in FIG. 5.

To unfold frame members 40, 44, they are rotated back toward each other about hinge 54. Second surface 104 of key 100 rides over curved fourth surface or cam 98 of second interactive member 66 as shown in FIG. 8 until key 100 falls into notch 99 as shown in FIG. 5.

Figure 11:
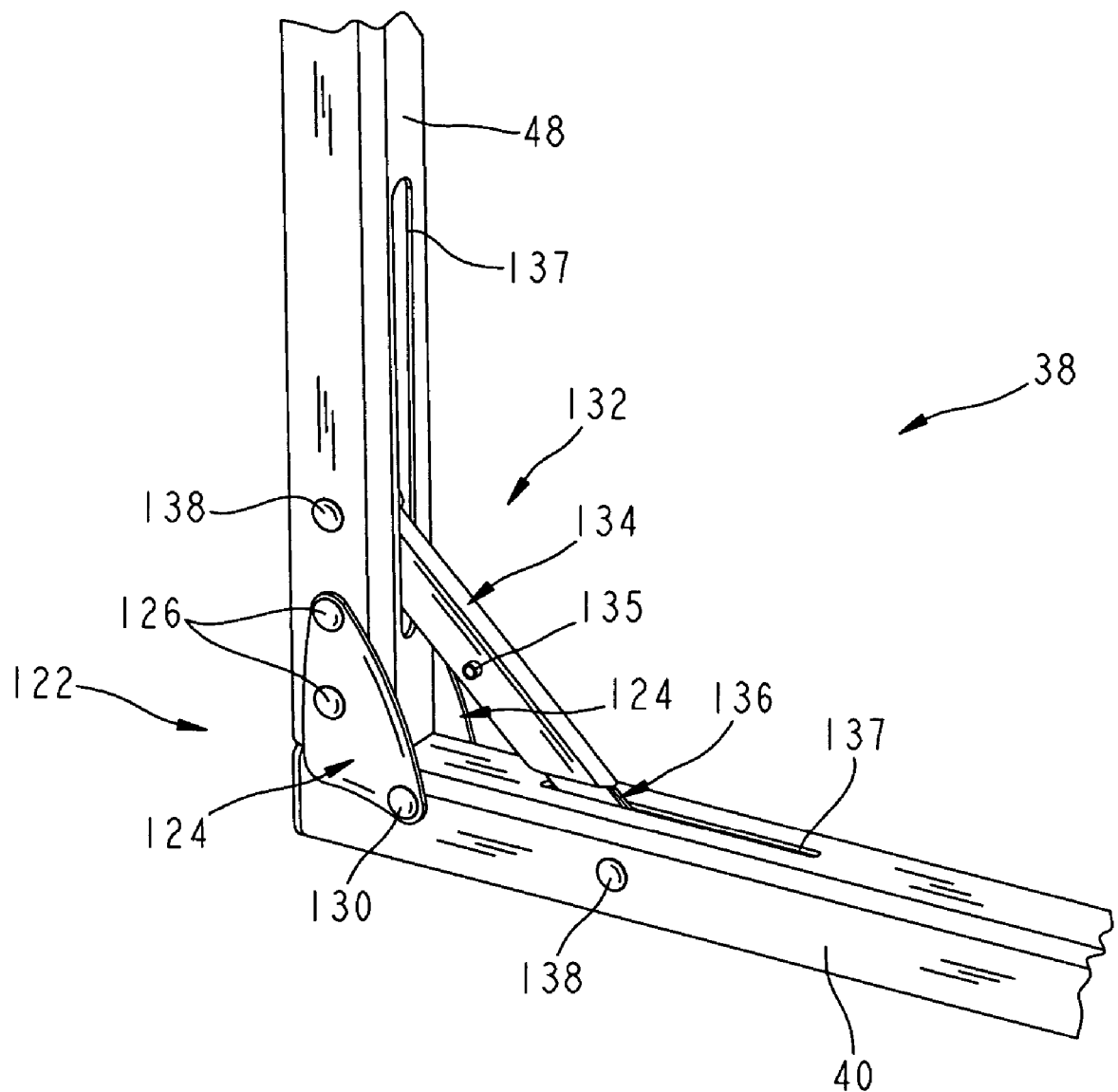
FIG. 11 is a perspective view of a corner of the screen frame showing the frame include a pair of frame members, with portions broken away, a hinge pivotally coupling the frame members together, and a lock blocking pivoting movement of the frame members relative to one another.

As shown in FIG. 11, hinges 122 are provided at each corner 32, 34, 36, 38 of frame 16. Hinges 122 include a pair of hinge plates 124, a first pair of rivets 126 that couple hinge plates 124 to exemplary frame member 48, and a pivot member 130 that pivotally couples hinge plates 124 to exemplary frame member 40.

A lock 132 is provided at each corner 32, 34, 36, 38 that blocks relative rotation of the respective frame members 40, 44, 46, 48. Each lock 132 includes first and second lock members 134, 136, a pivot member 135 that pivotally couples lock members 134, 136 together, and a pair of pivot members 138 that pivotally couple the respective lock members 134, 136 to respective frame members 40, 44, 46, 48 as shown in FIG. 11 for exemplary frame members 40, 48. First lock member 134 is U-shaped to receive a portion of second lock member 136. Each frame member 40, 48 includes a slot 137 in which lock members 134, 136 are positioned when frame 16 is folded. To unlock lock 132, lock members 134, 136 are pushed or pulled away from hinge 122. To lock lock 132, lock members 134, 136 are pushed or pulled toward hinge 122.

As shown in FIG. 2, each leg 18 includes an upright 139, a base 140, and a brace 142. Upright 139 includes three tubular frame members 143, 144, 146 similar to frame members 40, 42, 44, 46, 48 and locks 56 between frame members 143, 144, 146. Base 140 includes two tubular frame members 148, 150 similar to frame members 40, 42, 44, 46, 48. Hinges 122 and lock 132 are provided between upright 139 and frame members 148, 150 to provide for pivoting movement and locking between upright 139 and frame members 148, 150. One lock 132 is positioned in the interior regions of frame members 146, 148 and one lock 132 is positioned on the exterior of frame members 146, 150 as shown in FIG. 2.

Brace 142 includes two tubular frame members 152, 154 similar to frame members 40, 42, 44, 46, 48, a lock 54 between frame members 152, 154, a hinge 156 between frame member 152 and base frame member 148, and a coupling member 158 pivotally coupled to frame member 154. A threaded knob 160 is provided that releasably couples member 158 to frame member 144. Frame member 154 is divided into two separate pieces and includes a telescoping member (not shown) positioned therein to permit the length of frame member 154 to be extended or retracted. Another knob 163 is provided to block extension or retraction of frame member 154 when tightened and to allow extension or retraction of frame member 154 when loosened.

Frame members 46, 48 of frame 16 include a plurality of threaded apertures 162 that receive knobs 164. To adjust the height of frame 16, knobs 164 are unscrewed, aligned with the next set of lower or higher apertures 162, and screwed into said apertures 162. If necessary, knobs 164 can be removed from legs 18 and repositioned in other locations in the provided apertures 165.

To store screen apparatus 10, frame 16 is uncoupled from legs 18 by unscrewing knobs 164; screen 14 is removed from frame 16; each lock 54, 132 of frame 16 is unlocked and frame members 40, 42, 44, 46, 48 are folded 90° or 180° to the position shown in FIG. 10; knob 160 of legs 18 are unscrewed; each lock 54, 132 of legs 18 are unlocked; and frame members 142, 144, 146, 148, 150, 152, 154 are folded 90° or 180°. To setup screen apparatus 10, the above steps are done in reverse order.

Preferably, instructions for the assembly, installation, and/or use of projection screen apparatus 10 are provided with projection screen apparatus 10 or otherwise communicated to permit a person or machine to assemble, install and/or use projection screen apparatus 10. Such instructions may include a description of any or all portions of projection screen apparatus 10 and/or any or all of the above-described assembly, installation, and use of projection screen apparatus 10 or components of projection screen apparatus 10. The instructions may be provided on separate papers and/or on the packaging in which projection screen apparatus 10 is sold or shipped. These instructions may also be provided over the Internet or other communication system. Furthermore, the instructions may be embodied as text, pictures, audio, video, or any other medium or method of communicating instructions known to those of ordinary skill in the art.

Although the present invention has been described in detail with reference to preferred embodiments, variations and modifications exist within the scope and spirit of the present invention as described and defined in the following claims.

The invention claimed is:

1. A display apparatus including
a screen and
a frame system supporting the screen, the frame system having a plurality of frame members, a hinge coupling two of the frame members together, and a lock positioned to block movement of the frame members coupled together by the hinge, the frame members coupled together by the hinge cooperating to define a longitudinal axis and a transverse profile, at least a portion of the lock being positioned within the transverse profile, the lock including first and second lock members that move relative to one another to permit the frame members to move relative to one another, a portion of the first lock member being positioned within the transverse profile and a portion of the first lock member being positioned outside of the transverse profile, the hinge including a plurality of hinge plates and fasteners, at least one of the fasteners extending through at least a portion of at least one of the hinge plates, at least one of the first and second lock members, and a portion of at least one of the frame members.

2. The apparatus of claim 1, wherein the second lock member is positioned completely within the transverse profile.

3. The apparatus of claim 1, wherein the frame members coupled together by the hinge are tubular and cooperate to define a passage, and a majority of the lock is positioned within the passage.

4. The apparatus of claim 1, wherein at least one of the frame members coupled together by the hinge is tubular and has an outer wall, two ends, and an aperture positioned between the two ends, at least one of the first and second lock members is movable relative to the other lock member due to force applied to the lock, the force being transmitted through the aperture.

5. The apparatus of claim 1, wherein at least one of the first and second lock members pivots about a pivot axis between a locked position blocking movement of the frame members on the hinge and an unlocked position permitting movement of the frame members on the hinge, the pivot axis extends through at least one of the frame members coupled together by the hinge.

6. The apparatus of claim 1, wherein the frame members coupled together by the hinge are tubular and have an outer wall and two ends, the first lock member extends through an end of each of the frame members coupled together by the hinge.

7. The apparatus of claim 1, wherein the first lock member includes a key, the second lock member includes a key-receiving portion that receives the key of the first lock member to block relative movement of the frame members coupled together by the hinge, the hinge includes a first hinge plate and a second hinge plate pivotally coupled to the first hinge plate, at least the first hinge plate overlaps each of the frame members coupled together by the hinge, and the screen is substantially blank.

8. A display apparatus including
a screen and
a frame system supporting the screen, the frame system having a plurality of frame members, a hinge coupling two of the frame members together, and a lock positioned to block relative movement of the frame members, the lock including first and second interactive members, the first interactive member having a key, and the second interactive member having a key-receiving portion that receives the key of the first interactive member to block relative movement of the frame members when the key is positioned in the key-receiving portion and to permit relative movement of the frame members when the key is spaced apart from the key-receiving portion.

9. The apparatus of claim 8, wherein the key includes a substantially flat surface and the key-receiving portion includes a substantially flat surface that abuts the substantially flat surface of the key when the key is positioned in the key-receiving portion.

10. The apparatus of claim 9, wherein at least one of the first and second interactive members pivots about a pivot axis and the substantially flat surfaces of the key and key-receiving portions are substantially tangent to the pivot axis.

11. The apparatus of claim 8, wherein the key is wedge-shaped and the key-receiving portion compliments the wedge shape of the key.

12. The apparatus of claim 8, wherein the key includes a pair of substantially flat surfaces and the key-receiving portion includes a pair of substantially flat surfaces that abut the substantially flat surfaces of the key when the key is positioned in the key-receiving portion.

13. The apparatus of claim 8, wherein the second interactive member includes a cam and the key rides over the cam before being positioned in the key-receiving portion to block movement of the frame members relative to one another.

14. The apparatus of claim 8, wherein the frame members are tubular and cooperate to define a passage and a majority of the lock is positioned in the passage.

15. A display apparatus including
a screen and
a frame system supporting the screen, the frame system having at least first and second frame members, a hinge coupling the first and second frame members together, and a lock positioned to block relative movement of the first and second frame members, the hinge including a first hinge member, a second hinge member pivotally coupled to the first hinge member, a third hinge member, and a fourth hinge member pivotally coupled to the third hinge member, the first and third hinge members being rigidly coupled to the first frame member, the second and fourth hinge members being rigidly coupled to the second frame member, the second hinge member being positioned between the first hinge member and the second frame member, and the third hinge member being positioned between the fourth hinge member and the second frame member.

16. The apparatus of claim 15, wherein the second hinge member is sandwiched between the first hinge member and the first and second frame members.

17. The apparatus of claim 16, wherein the first and fourth hinge members are stamped to include a jog so that the first and fourth hinge members cooperate with the first and second frame members to define gaps to receive the second and third hinge members.

18. The display apparatus of claim 1, wherein the two frame members coupled together by the hinge extend along a perimeter of the screen.

19. The display apparatus of claim 1, wherein the two frame members coupled together by the hinge are co-linear.

20. The display apparatus of claim 1, wherein the portion of the first lock member positioned outside the transverse profile is positioned between at least one of the frame members and the screen.

21. The display apparatus of claim 1, wherein the plurality of frame members cooperate to define a polygon and the screen has a perimeter matching the polygon.

22. The display apparatus of claim 8, wherein the first interactive member includes a recess positioned adjacent to the key and a portion of the second interactive member is positioned in the recess when the key is positioned in the key-receiving portion and is spaced apart from the recess when the key is spaced apart from the key-receiving portion.

23. The display apparatus of claim 8, wherein the key receiving-portion includes three substantially flat surfaces that abut three substantially flat surfaces of the key when the key is positioned in the key-receiving portion.

24. The display apparatus of claim 8, wherein the first interactive member and the second interactive members have substantially equal lateral widths.

25. The display apparatus of claim 5, wherein the hinge includes a second pivot axis positioned outside the transverse profile, and the frame members move relative to one another about the second pivot axis of the hinge.

26. The display apparatus of claim 1, wherein the plurality of hinge plates includes a first hinge plate, a second hinge plate pivotally coupled to the first hinge plate, a third hinge plate, and a fourth hinge plate pivotally coupled to the third hinge plate, the first and third hinge plates being rigidly coupled to one of the frame members coupled together by the hinge, the second and fourth hinge plates being rigidly coupled to the other of the frame members coupled together by the hinge, wherein the plurality of fasteners includes a first fastener and a second fastener, the first fastener extends through the first and third hinge plates, the one of the frame members, and the first lock member, and the second fastener extends through the second and fourth hinge plates, the other of the frame members, and the second lock member.

27. A display apparatus including:
a screen; and
a frame system supporting the screen, the frame system having a plurality of frame members, a hinge coupling two of the frame members together, and a lock positioned to block movement of the frame members coupled together by the hinge, the frame members coupled together by the hinge cooperating to define a longitudinal axis and a transverse profile, at least a portion of the lock being positioned within the transverse profile, the lock including first and second lock members that move relative to one another to permit the frame members to move relative to one another, a portion of the first lock member being positioned within the transverse profile and a portion of the first lock member being positioned outside of the transverse profile, at least one of the frame members coupled together by the hinge being tubular and having an outer wall, two ends, and an aperture positioned between the two ends, at least one of the first and second lock members being movable relative to the other lock member due to force applied to the lock, the force being transmitted through the aperture.

28. The display apparatus of claim 27, wherein the first lock member is pivotally coupled to one of the frame members coupled together by the hinge and the second lock member is fixedly coupled to the other of the frame members coupled together by the hinge, and the second lock member is positioned completely within the transverse profile.

29. The display apparatus of claim 27, the hinge including a plurality of hinge plates and fasteners, at least one of the fasteners extending through at least a portion of at least one of the hinge plates, at least one of the first and second lock members, and a portion of at least one of the frame members.

30. The display apparatus of claim 27, wherein the first lock member pivots about a first pivot axis between a locked position blocking movement of the frame members on the hinge and an unlocked position permitting movement of the frame members on the hinge, the first pivot axis extends through at least one of the frame members coupled together by the hinge, the hinge includes a second pivot axis positioned outside the transverse profile, and the frame members move relative to one another about the second pivot axis of the hinge.

31. The display apparatus of claim 30, wherein each of the frame members coupled together by the hinge are tubular and have an outer wall, two ends, and an aperture positioned between the two ends, a majority of the lock is positioned in the apertures of the frame members, and the first lock member extends through an end of each of the frame members coupled together by the hinge.

32. A display apparatus including:
a screen; and
a frame system supporting the screen, the frame system having a plurality of frame members, a hinge coupling two of the frame members together, and a lock positioned to block movement of the frame members coupled together by the hinge, the frame members coupled together by the hinge cooperating to define a longitudinal axis and a transverse profile, at least a portion of the lock being positioned within the transverse profile, the lock including first and second lock members that move relative to one another to permit the frame members to move relative to one another, a portion of the first lock member being positioned within the transverse profile and a portion of the first lock member being positioned outside of the transverse profile, at least one of the first and second lock members being configured to pivot about a pivot axis between a locked position blocking movement of the frame members on the hinge and an unlocked position permitting movement of the frame members on the hinge, the pivot axis extending through at least one of the frame members coupled together by the hinge.

33. The display apparatus of claim 32, wherein the frame members coupled together by the hinge are tubular and cooperate to define a passage, a majority of the lock is positioned within the passage, the first lock member is configured to pivot about the pivot axis between the locked position and the unlocked position, and the second lock member is positioned completely within the transverse profile.

34. The display apparatus of claim 33, wherein the first lock member is configured to pivot about the pivot axis due to a force applied to the portion of the first lock member positioned outside the transverse profile.

35. The display apparatus of claim 33, wherein the first lock member includes a key and the second lock member includes a key-receiving portion that receives the key of the first lock member to block relative movement of the frame members coupled together by the hinge, and the frame members coupled together by the hinge cooperate to define the longitudinal axis and the transverse profile when the key of the first lock member is received in the key-receiving portion of the second lock member.

36. A display apparatus including:
a screen; and
a frame system supporting the screen, the frame system having a plurality of frame members, a hinge coupling two of the frame members together, and a lock positioned to block movement of the frame members coupled together by the hinge, the frame members coupled together by the hinge cooperating to define a longitudinal axis and a transverse profile, at least a portion of the lock being positioned within the transverse profile, the lock including first and second lock members that move relative to one another to permit the frame members to move relative to one another, a portion of the first lock member being positioned within the transverse profile and a portion of the first lock member being positioned outside of the transverse profile, the first lock member including a key, the second lock member including a key-receiving portion that receives the key of the first lock member to block relative movement of the frame members coupled together by the hinge, the hinge including a first hinge plate and a second hinge plate pivotally coupled to the first hinge plate, at least the first hinge plate overlapping each of the frame members coupled together by the hinge, the screen being substantially blank.

37. A display apparatus including:

a screen; and a frame system supporting the screen, the frame system having a plurality of frame members, a hinge coupling two of the frame members together, and a lock positioned to block movement of the frame members coupled together by the hinge, the frame members coupled together by the hinge cooperating to define a longitudinal axis and a transverse profile, at least a portion of the lock being positioned within the transverse profile, a second portion of the lock being positioned outside the transverse profile, the second portion being positioned between at least one of the frame members and the screen.

38. The display apparatus of claim 37, wherein the lock includes first and second lock members that move relative to one another to permit the frame members to move relative to one another, the second lock member being positioned completely within the transverse profile.

39. The display apparatus of claim 37, wherein the frame members coupled together by the hinge are tubular and cooperate to define a passage, and a majority of the lock is positioned within the passage.

40. The display apparatus of claim 37, wherein the hinge includes a plurality of hinge plates and fasteners, at least one of the fasteners extending through at least a portion of at least one of the hinge plates, the lock, and a portion of at least one of the frame members.

41. The display apparatus of claim 37, wherein the frame members coupled together by the hinge are tubular and have an outer wall and two ends, and the lock extends through an end of each of the frame members coupled together by the hinge.

42. The display apparatus of claim 41, wherein the two frame members coupled together by the hinge are co-linear.

* * * * *